(12) United States Patent
Wuidart

(10) Patent No.: US 9,356,656 B2
(45) Date of Patent: May 31, 2016

(54) ASSISTANCE FOR POSITIONING A TRANSPONDER

(75) Inventor: Luc Wuidart, Pourrières (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 203 days.

(21) Appl. No.: 14/123,739

(22) PCT Filed: Apr. 18, 2012

(86) PCT No.: PCT/FR2012/050842
§ 371 (c)(1),
(2), (4) Date: Dec. 16, 2013

(87) PCT Pub. No.: WO2012/164178
PCT Pub. Date: Dec. 6, 2012

(65) Prior Publication Data
US 2014/0113554 A1    Apr. 24, 2014

(30) Foreign Application Priority Data

Jun. 3, 2011  (FR) ..................... 11 54861

(51) Int. Cl.
*H04B 5/00*  (2006.01)
*G06K 7/00*  (2006.01)
*G06K 7/10*  (2006.01)

(52) U.S. Cl.
CPC ............... *H04B 5/00* (2013.01); *G06K 7/0008* (2013.01); *G06K 7/10128* (2013.01); *G06K 7/10386* (2013.01)

(58) Field of Classification Search
CPC ............ G06K 7/0008; G06K 7/10128; G06K 7/10386; H04B 5/00
See application file for complete search history.

(56) References Cited

U.S. PATENT DOCUMENTS

| 5,703,573 | A  | 12/1997 | Fujimoto et al. |
| 6,356,198 | B1 | 3/2002  | Wuidart et al.  |
| 6,462,647 | B1 | 10/2002 | Roz             |
| 6,473,028 | B1 | 10/2002 | Luc             |
| 6,547,149 | B1 | 4/2003  | Wuidart et al.  |
| 6,650,226 | B1 | 11/2003 | Wuidart et al.  |

(Continued)

FOREIGN PATENT DOCUMENTS

| EP | 0 722 094 A1 | 7/1996 |
| EP | 0857981      | 8/1998 |

(Continued)

OTHER PUBLICATIONS

English Translation of the Written Opinion of the International Searching Authority dated Dec. 4, 2013 from corresponding International Application No. PCT/FR2012/050842.

(Continued)

*Primary Examiner* — Nabil Syed
(74) *Attorney, Agent, or Firm* — Seed IP Law Group PLLC

(57) ABSTRACT

A method for assisting with positioning of an electromagnetic transponder by a user with respect to a terminal, wherein: a first value of the current in an oscillating circuit of the terminal is periodically measured; a second value of a ratio between a no-load value of this current, stored when no transponder is in the field of the terminal, and the first value, is calculated; and pieces of information intended for the user are controlled according to said second value.

19 Claims, 4 Drawing Sheets

(56) References Cited

U.S. PATENT DOCUMENTS

| | | |
|---|---|---|
| 6,650,229 B1 | 11/2003 | Wuidart et al. |
| 6,703,921 B1 | 3/2004 | Wuidart et al. |
| 6,784,785 B1 | 8/2004 | Wuidart et al. |
| 6,879,246 B2 | 4/2005 | Wuidart |
| 6,944,424 B2 | 9/2005 | Heinrich et al. |
| 6,950,008 B2 | 9/2005 | Hagl et al. |
| 6,960,985 B2 | 11/2005 | Wuidart |
| 7,005,967 B2 | 2/2006 | Wuidart |
| 7,046,121 B2 | 5/2006 | Wuidart |
| 7,049,935 B1 | 5/2006 | Wuidart et al. |
| 7,049,936 B2 | 5/2006 | Wuidart |
| 7,058,357 B1 | 6/2006 | Wuidart et al. |
| 7,107,008 B2 | 9/2006 | Wuidart |
| 7,263,330 B2 | 8/2007 | Wuidart |
| 7,606,532 B2 | 10/2009 | Wuidart |
| 7,995,965 B2 | 8/2011 | Wuidart |
| 8,130,159 B2 | 3/2012 | Wuidart et al. |
| 8,395,485 B2 | 3/2013 | Wuidart |
| 8,446,259 B2 | 5/2013 | Wuidart |
| 8,482,388 B2 | 7/2013 | Wuidart |
| 8,564,413 B2 | 10/2013 | Wuidart |
| 8,676,163 B2 | 3/2014 | Wuidart |
| 8,693,956 B2 | 4/2014 | Wuidart |
| 8,718,552 B2 | 5/2014 | Wuidart |
| 8,798,533 B2 | 8/2014 | Wuidart |
| 8,907,761 B2 | 12/2014 | Wuidart |
| 8,922,338 B2 | 12/2014 | Wuidart |
| 8,922,341 B2 | 12/2014 | Wuidart |
| 8,988,196 B2 | 3/2015 | Wuidart |
| 9,098,788 B2 | 8/2015 | Wuidart |
| 2003/0071717 A1 | 4/2003 | Hagl et al. |
| 2003/0121985 A1 | 7/2003 | Baldischweiler et al. |
| 2003/0169169 A1 | 9/2003 | Wuidart et al. |
| 2004/0104809 A1 | 6/2004 | Rizzo et al. |
| 2005/0001609 A1 | 1/2005 | Cuylen |
| 2005/0141256 A1 | 6/2005 | Yamazaki et al. |
| 2005/0231328 A1 | 10/2005 | Castle et al. |
| 2006/0172702 A1 | 8/2006 | Wuidart et al. |
| 2007/0164122 A1 | 7/2007 | Ju |
| 2008/0079542 A1 | 4/2008 | Rofougaran |
| 2008/0129509 A1 | 6/2008 | Duron |
| 2008/0136643 A1 | 6/2008 | Yeo et al. |
| 2008/0204206 A1 | 8/2008 | Frohler |
| 2009/0065575 A1 | 3/2009 | Phillips et al. |
| 2009/0273452 A1* | 11/2009 | Wuidart ............. G06K 19/0701 340/10.4 |
| 2010/0068999 A1 | 3/2010 | Bangs et al. |
| 2010/0283698 A1 | 11/2010 | Orihara |
| 2010/0291871 A1 | 11/2010 | Butler |
| 2010/0323629 A1 | 12/2010 | Wuidart |
| 2010/0328045 A1 | 12/2010 | Goto et al. |
| 2011/0095769 A1 | 4/2011 | Wuidart |
| 2011/0140852 A1 | 6/2011 | Wuidart |
| 2011/0193688 A1* | 8/2011 | Forsell ................ A61N 1/3787 340/10.4 |
| 2011/0319016 A1 | 12/2011 | Gormley et al. |
| 2012/0092901 A1 | 4/2012 | Wuidart |
| 2012/0105012 A1 | 5/2012 | Wuidart |
| 2014/0113554 A1 | 4/2014 | Wuidart |
| 2014/0113692 A1 | 4/2014 | Wuidart |
| 2014/0118115 A1 | 5/2014 | Wuidart |

FOREIGN PATENT DOCUMENTS

| | | |
|---|---|---|
| EP | 1 043 677 A1 | 10/2000 |
| EP | 1 071 038 A1 | 1/2001 |
| EP | 1 304 661 A1 | 4/2003 |
| EP | 2077518 A1 | 7/2009 |
| EP | 2114019 A1 | 11/2009 |
| FR | 2 757 952 A1 | 7/1998 |
| GB | 2 321 725 A1 | 8/1998 |
| GB | 2464362 A | 4/2010 |
| WO | 2009/105115 A2 | 8/2009 |

OTHER PUBLICATIONS

English Translation of Written Opinion of International Searching Authority dated Dec. 4, 2013 for corresponding International Application No. PCT/FR2012/050843, 10 pages.

English Translation of Written Opinion of International Searching Authority dated Dec. 4, 2013 for corresponding International Application No. PCT/FR2012/050844, 6 pages.

English Translation of Written Opinion of International Searching Authority dated Dec. 4, 2013 for corresponding International Application No. PCT/FR2012/050845, 6 pages.

International Search Report dated Sep. 10, 2012 from corresponding related International Application No. PCT/FR2012/050842.

International Search Report dated Jun. 26, 2012 from potentially related International Application No. PCT/FR2012/050843.

International Search Report dated Sep. 7, 2012 from potentially related International Application No. PCT/FR2012/050844.

International Search Report dated Sep. 7, 2012 from potentially related International Application No. PCT/FR2012/050845.

French Search Report dated Feb. 9, 2010, for corresponding FR Application No. 0954147, 2 pages.

French Search Report dated Feb. 9, 2010, for corresponding FR Application No. 0954148, 2 pages.

French Search Report dated Feb. 8, 2010, for corresponding FR Application No. 0954149, 2 pages.

French Search Report dated Feb. 2, 2010, for corresponding FR Application No. 0954345, 2 pages.

French Search Report dated Feb. 3, 2010, for corresponding FR Application No. 0954347, 2 pages.

French Search Report dated Feb. 17, 2010, for corresponding FR Application No. 0954351, 2 pages.

Translation of International Search Report and Written Opinion dated Jun. 3, 2010, for corresponding International Application No. PCT/FR2010/051090, 4 pages.

Translation of International Search Report and Written Opinion dated Jun. 3, 2010, for corresponding International Application No. PCT/FR2010/051091, 4 pages.

* cited by examiner

US 9,356,656 B2

ASSISTANCE FOR POSITIONING A TRANSPONDER

CROSS REFERENCE TO RELATED APPLICATIONS

This application is the U.S. National Stage of international patent application number PCT/FR2012/050842, filed on Apr. 18, 2012, which claims the priority benefit of French patent application number 11/54861, filed on Jun. 3, 2011, which applications are hereby incorporated by reference to the maximum extent allowable by law.

BACKGROUND

1. Technical Field

Embodiments generally relate to systems using transponders, that is, transceivers (generally mobile) capable of communicating in a contactless and wireless manner with a terminal.

2. Discussion of the Related Art

Electromagnetic transponder systems are more and more used with the coming up of mobile telecommunication devices equipped with near field communication (NFC) routers. In such devices, the mobile equipment may be used both as a transponder reader, for example, as a contactless chip card reader and, conversely, as an actual transponder for a near field communication with a terminal, for example, another mobile device, an access terminal, etc.

A recurring issue in the use of electromagnetic transponders is, for the quality of the communication, the distance separating the transponder from the reader.

In particular, a natural reflex of the bearer of the transponder (for example, of the contactless chip card) is to press the card against the reader surface. This pressure may even be strong enough to fold the card. This results in mechanical stress on the chip card which is capable of damaging the antenna generally formed of a conductive winding embedded in the card, or of damaging the contacts between the antenna and the chip.

Further, the positioning of the transponder is often not optimal for the system operation.

SUMMARY

It would be desirable to have means enabling to avoid that a user submits a transponder to unnecessary mechanical stress.

It would further be desirable to optimize the communication between a transponder (be it a chip card or a mobile device equipped with an NFC router operating as a transponder) and a terminal.

An embodiment overcomes all or part of the disadvantages of known transponder systems.

An embodiment provides a method for assisting with positioning of an electromagnetic transponder by a user with respect to a terminal, wherein:

a first value of the current in an oscillating circuit of the terminal is periodically measured;

a second value of a ratio between a no-load value of this current, stored when no transponder is in the field of the terminal, and the first value, is calculated; and pieces of information intended for the user are controlled according to said second value.

According to an embodiment, said second value is compared with two thresholds surrounding value 2.

According to an embodiment, the thresholds are selected according to operating parameters around an optimum coupling position in which the communication between the transponder and the terminal is considered to be optimal.

According to an embodiment, when said value of the ratio is between the two thresholds, the terminal notifies the user to no longer modify the distance between the transponder and the terminal.

According to an embodiment, the second value is successively compared with the two thresholds to define whether the user should increase or decrease the distance between the terminal and the transponder.

According to an embodiment, said second value is compared with the value of said ratio calculated in a previous measurement to determine whether the distance between the transponder and the terminal varies.

According to an embodiment, said pieces of information indicate to the user whether he should decrease or increase the distance between the transponder and the terminal or not modify this distance.

An embodiment provides an electromagnetic transponder read terminal comprising means capable of implementing the method.

An embodiment also provides a cell phone comprising such a terminal.

The foregoing and other objects, features, and advantages will be discussed in detail in the following non-limiting description of specific embodiments in connection with the accompanying drawings.

DETAILED DESCRIPTION

Figure 1:
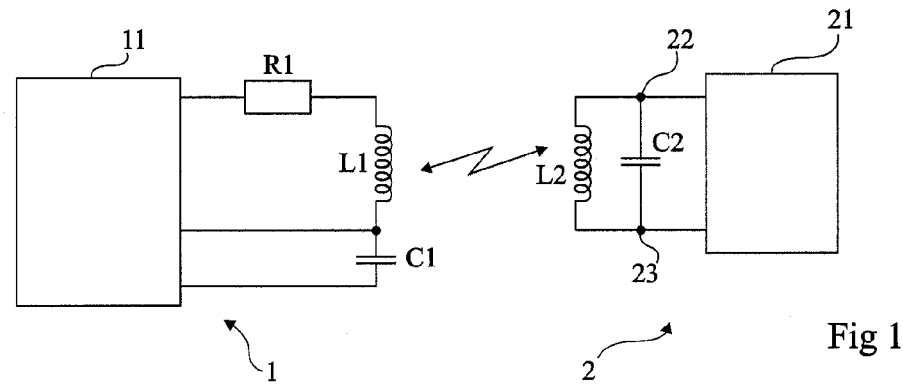
FIG. 1 very schematically shows an example of a transponder near-field communication system.

The same elements have been designated with the same reference numerals in the different drawings. For clarity, only those steps and elements which are useful to the understanding of the described embodiments have been shown and will be detailed. In particular, the origin and the destination of the data transmitted in communications between a transponder and a terminal have not been detailed, the described embodiments being compatible with any usual communication.

FIG. 1 very schematically shows an example of a communication and remote-supply system comprising a terminal 1 or read and/or write terminal, and a transponder 2.

Generally, terminal 1 comprises a series oscillating circuit, formed of an inductance L1 in series with a capacitor C1 and a resistor R1. This series oscillating circuit is controlled by a device 11 comprising, among others and without this being a limitation, an amplifier or antenna coupler and a transmission control and exploitation circuit especially comprising a modulator/demodulator and a command and data processing circuit (generally, a microprocessor). Device 11 generally communicates with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer).

A transponder 2 capable of cooperating with terminal 1 comprises an oscillating circuit, for example, parallel, formed of an inductance L2 in parallel with a capacitor C2 between two input terminals 22 and 23 of a control and processing circuit 21. Terminals 22 and 23 are, in practice, connected to input terminals of a rectifying element (not shown in FIG. 1) having output terminals forming terminals for supplying the circuits internal to the transponder. Such circuits generally comprise a memory and a modulator for transmitting data to the terminal. According to the transponder type (depending on the application and on the tasks that it is supposed to perform), these circuits may also comprise a demodulator of the signals that may be received from the terminal, a microprocessor, and various other processing circuits.

The oscillating circuits of the terminal and of the transponder are generally tuned to a same frequency corresponding to the frequency of an excitation signal of the oscillating circuit of the terminal. This high-frequency signal (for example, at 13.56 MHz) is used not only as a data transmission carrier from the terminal to the transponder, but also as a remote-supply carrier for the transponders located in the field of the terminal. When a transponder 2 is in the field of terminal 1, a high-frequency voltage is generated between terminals 21 and 23 of the resonant circuit of the transponder. This voltage is used to provide the power supply voltage of electronic circuits 21 of the transponder.

Figure 2:
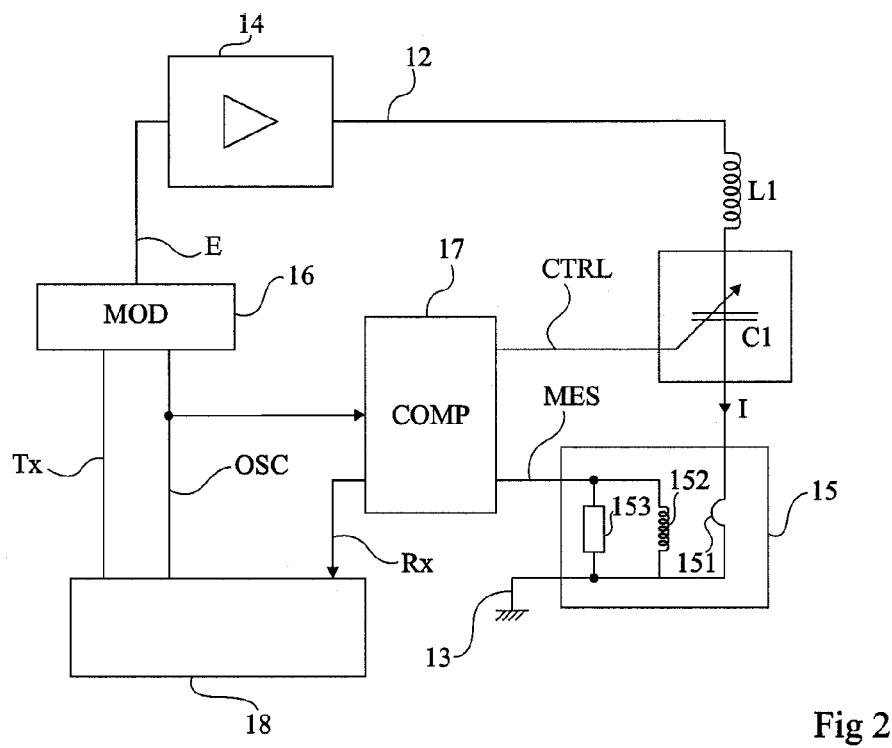
FIG. 2 is a simplified block diagram of the terminal of FIG. 1.

FIG. 2 is a block diagram of an embodiment of a terminal 1. As indicated previously, the terminal comprises an oscillating circuit formed of an inductance or antenna L1 in series with a capacitive element C1 and with a resistive element R1. In the example of FIG. 2, these elements are connected between an output terminal 12 of an amplifier or antenna coupler 14 and a terminal 13 at a reference voltage (generally the ground). In FIG. 2, resistor R1 is assumed to be comprised in block 14. An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal E originating from a modulator 16 (MOD) which receives a reference frequency (signal OSC), for example, from a quartz oscillator (not shown). Modulator 16 receives, if need be, a data signal Tx to be transmitted and, in the absence of any data transmission from the terminal, provides the high-frequency carrier (for example, at 13.56 MHz) capable of remotely supplying a transponder. Capacitive element C1 preferably is a variable-capacitance element controllable by a signal CTRL. The phase of the current in antenna L1 is regulated with respect to a reference signal. This regulation is a regulation of the high-frequency signal, that is, of the carrier signal corresponding to signal E in the absence of data to be transmitted. The regulation is performed by varying capacitance C1 of the oscillating circuit of the terminal to maintain the current in antenna L1 in constant phase relationship with the reference signal. The reference signal for example corresponds to signal OSC provided by the oscillator to the modulator. Signal CTRL originates from a circuit 17 (COMP) having the function of detecting the phase shift with respect to the reference signal and to accordingly modify the capacitance of element C1. The phase measurement is, for example, performed from a measurement of current I in the oscillating circuit by means of measurement element 15. In the shown example, this element is formed of a current transformer comprising a primary winding 151 between element C1 and ground terminal 13, and a secondary winding 152 having a first terminal directly connected to ground and having its other terminal providing a signal MES indicative of the result of the measurement. A current-to-voltage conversion resistor 153 is connected in parallel with secondary winding 152. The result of measurement MES is sent to comparator 17, which accordingly controls the value of capacitive element C1 by means of signal CTRL.

In the embodiment illustrated in FIG. 2, comparator 17 uses the same phase demodulator (not shown) as that which is used to demodulate the signal originating from the transponder and which is possibly received by the oscillating circuit. Accordingly, comparator 17 provides a signal Rx giving back a possible retromodulation of the data received from a transponder to a block 18 symbolizing the rest of the electronic circuits of the terminal.

The response time of the phase regulation loop is selected to be sufficiently long to avoid disturbing the possible retromodulation from a transponder and sufficiently short as compared with the speed at which a transponder passes in the field of the terminal. One can speak of a static regulation with respect to the modulation frequencies (for example, a 13.56-MHz frequency of the remote supply carrier and a 847.5-kHz retromodulation frequency used to transmit data from the transponder to the terminal).

As a variation of the current transformer of FIG. 2, other current measurement elements may be used (for example, a resistor).

An example of a phase regulation terminal is described in document EP-A-0857981.

Figure 3:
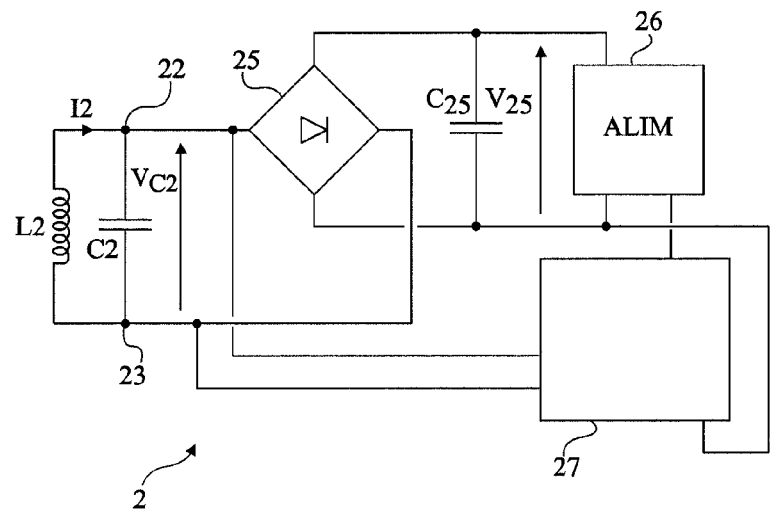
FIG. 3 is a simplified block diagram of the transponder of FIG. 1.

FIG. 3 shows an embodiment of a transponder 2. Between terminals 22 and 23 of the oscillating circuit (inductance and antenna L2 and capacitive element C2 in parallel), is connected a rectifying element 25, for example, a fullwave rectifying bridge. The rectified outputs of bridge 25 are interconnected by a smoothing capacitive element $C_{25}$ and provide a voltage $V_{25}$ to a circuit 26 (ALIM) for managing the transponder power supply. Circuit 26 supplies the other transponder circuits, symbolized by a block 27, with the power necessary to their operation. Elements 25, $C_{25}$, 26, and 27 are, in FIG. 1, comprised in block 21. Circuit 27 samples data between terminals 22 and 23 of the resonant circuit to be able to demodulate the possible data received from the terminal before rectification. Further, circuit 27 comprises so-called retromodulation capacitive and/or resistive elements, not shown, capable of modulating the load (LOAD) formed by the transponder on the field generated by the terminal. This load modification translates, on the terminal side, as a modification of the current or of the voltage of its oscillating circuit (assuming that amplifier or antenna coupler 14, in FIG. 2, is capable of providing a constant current). This current or voltage modification, detected by the current transformer (15, FIG. 2) or by any other measurement element (for example, the voltage measurement across capacitive element C1), enables the terminal to decode the data received from the transponder.

The fact that the phase is regulated on the terminal side enables using current and voltage measurements in the oscillating circuit of the terminal to deduce information relative to the transponder coupling when it is in the field of the terminal.

Such information takes into account, in particular, the coupling between the transponder and the terminal, that is, the coefficient of the coupling between the oscillating circuit of the terminal and that of the transponder. This coupling coefficient essentially depends on the distance separating the transponder from the terminal. The coupling coefficient, designated as k, between the oscillating circuits of a transponder and of a terminal, always ranges between 0 and 1.

In the embodiments which will be described, different relations between the electric quantities measureable by the terminal in different configurations of operation with a transponder are used to assist the user in positioning the transponder with respect to the terminal.

The position where the transponder is placed against the terminal is considered as the maximum coupling position. Indeed, the antennas of the transponder and of the terminal cannot be brought closer to each other, unless the terminal package is eliminated.

It is now known that an optimum coupling position $k_{opt}$, corresponding to the position at which voltage $V_{C2}$ recovered across the transponder (more specifically across its antenna) is maximum, exists between the terminal and the transponder. This optimum coupling position does not necessarily correspond to the maximum coupling position.

Figure 4:
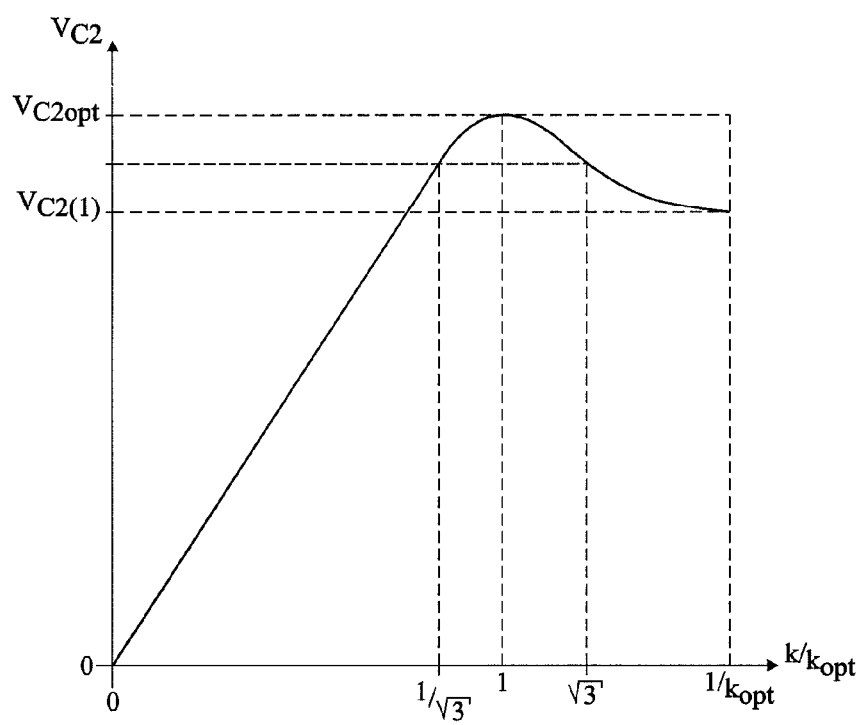
FIG. 4 illustrates an example of the variation of the voltage across the resonant circuit of the transponder according to a normalized coupling.

FIG. 4 shows an example of the shape of voltage $V_{C2}$ recovered on the transponder side according to normalized coupling $k/k_{opt}$.

The curve starts from the origin of ordinates (zero voltage) for a zero coupling. This corresponds to a distance from the transponder to the terminal such that no signal can be sensed by the transponder. Voltage $V_{C2}$ reaches a maximum $V_{C2opt}$ for an optimum coupling coefficient $k_{opt}$ ($k/k_{opt}=1$), then decreases to an intermediate value $V_{C2(1)}$ reached at coupling 1. The maximum coupling position is at a given location of this curve, but not necessarily at the optimum coupling position. This in particular depends on the different values of the capacitive and resistive elements.

Other remarkable points of the curve of FIG. 4 are points of inflexion where ratio $k/k_{opt}$ is respectively equal to $1/\sqrt{3}$ and to $\sqrt{3}$ and where voltage $V_{C2}$ has the same value on the transponder side.

Relations expressing voltage value $V_{C2}$ according to the ratio of the current coupling to the optimum coupling and linking these values to current I in the oscillating circuit of the terminal have become usual. For example, such relations are provided in document EP-A-2114019 (B8723-07-RO-225).

It is provided to exploit these relations to assist the user holding the transponder in placing it at an optimal distance from the terminal or reader to optimize the communication.

The position corresponding to a zero coupling (FIG. 4) corresponds to a position of the terminal with no transponder. Current I (FIG. 2) in the antenna or the oscillating circuit of the terminal has a so-called no-load value, noted $I_V$ or $I_{NO-LOAD}$.

As indicated, for example, in above-mentioned document EP-A-2114019, the ratio of current coupling k to optimum coupling $k_{opt}$ is linked to the no-load current and to the current value, noted I, of current I by the following relation:

$(k/k_{opt})^2 = I_V/I - 1$.

This relation may also be written as:

$I_V/I = (k/k_{opt})^2 + 1$.

In the optimum coupling position ($k=k_{opt}$), the current is $I_{opt}=I_V/2$. Further, there appears from the above formula that, in optimum coupling position, ratio $I_V/I=2$.

Figure 5A:
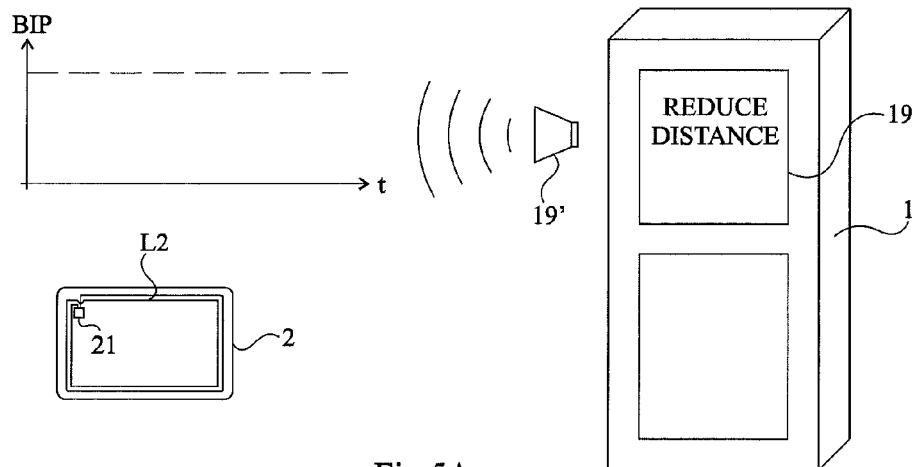
FIGS. 5A, 5B, and 5C illustrate an embodiment of the method for assisting the communication between a transponder and a reader.
Figure 5B:
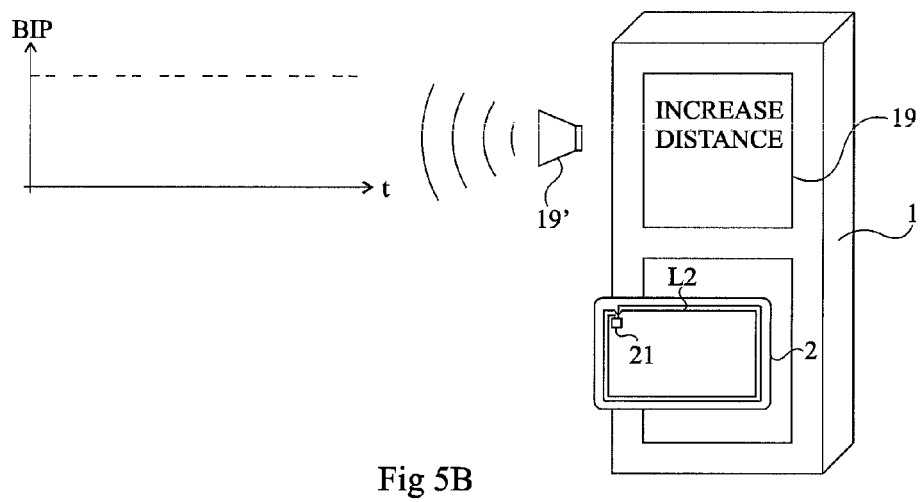
Figure 5C:
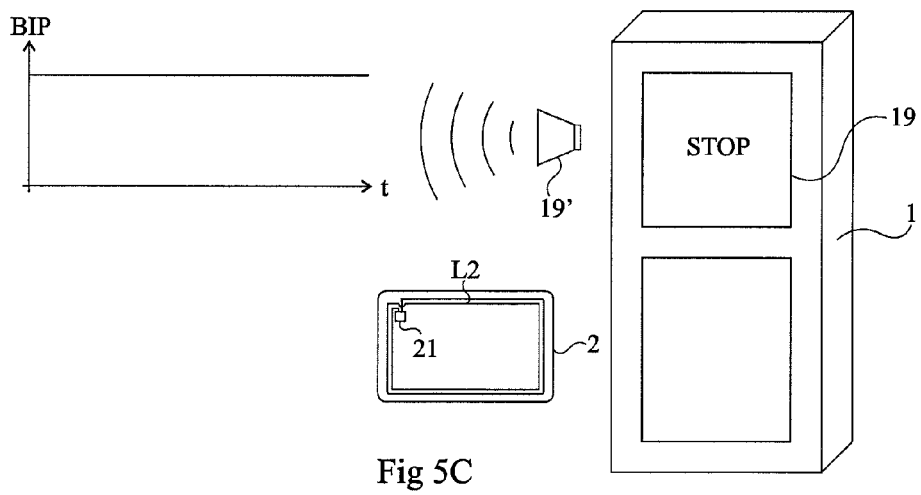

FIGS. 5A, 5B, and 5C illustrate, in simplified representations of respective positions of a terminal 1 and of a transponder 2, an embodiment of the positioning assistance method for optimizing communications.

Terminal 1 is assumed to be a mobile telecommunication device of cell phone or smartphone type and transponder 2 is assumed to be a chip card. All that will be described however also applies to the case where the transponder is a telecommunication terminal equipped with an NFC router and where terminal 1 is another mobile device operating in reader mode or is a fixed terminal, etc.

According to this embodiment, the relative information of ratio $I_V/I$ of the no-load current to the current in the oscillating circuit of terminal 1 is exploited to determine whether the transponder needs to be brought closer to or further away from the terminal. It should be noted that, when it is spoken of bringing the transponder closer to or further away from the terminal, this may correspond to moving a terminal away from or closer to the transponder, for example, in the case of a fixed transponder (transponder integrated to posters or the like).

The example of FIG. 5A corresponds to a position in which transponder 2 should be moved closer to terminal 1. A display 19 of the terminal displays a message (REDUCE DISTANCE) for the user and/or emits a sound signal (BEEP) by means of a loudspeaker 19'. A first sound signal frequency or a first sound pulse train is for example provided.

FIG. 5B illustrates the case where the transponder should be moved away from the terminal (for example, the case where it would be laid on the terminal and where the optimum coupling position would not correspond to this maximum coupling). In this case, display 19 displays a different message (INCREASE DISTANCE) for the user and/or emits a sound signal at another frequency or a sound pulse train (beeps) at another frequency than in the case of FIG. 5A.

FIG. 5C illustrates the case where transponder 2 is in a position of optimum coupling with respect to terminal 1. In this case, display 19 notifies it to the user, for example, by a STOP-type message and/or by a different sound signal (for example, a continuous sound signal or a signal at a different frequency than in the two previous cases).

Figure 6:
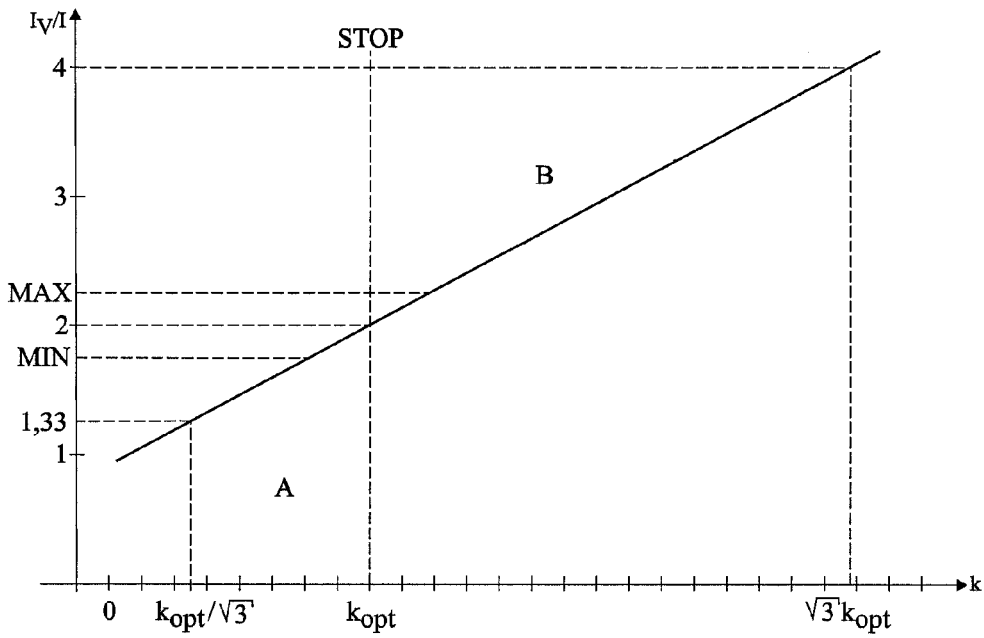
FIG. 6 illustrates the variation of a current ratio in the oscillating circuit of the reader according to the coupling.

FIG. 6 illustrates the variation of ratio $I_V/I$ according to coupling k.

This curve is remarkable in that it is linear from the zero coupling ($I_V/I=1$) through the point where the optimum coupling provides a ratio $I_V/I=2$. Two other remarkable points appear on the curve of FIG. 6. These points are the points of inflexion in the curve of FIG. 4. In the positions corresponding to these points of inflexion, this translates, on the terminal side, as a current ratio $I_V/I$ respectively equal to 1.33 ($k=k_{opt}/\sqrt{3}$) and 4 ($k=\sqrt{3} \cdot k_{opt}$).

It is also known that value $V_{C2max}$ is reached for a value of current coupling k which is either lower or greater than the optimum coupling.

Then, measuring current I and knowing no-load current $I_V$ is sufficient to determine current coupling k with respect to optimum coupling $k_{opt}$.

It should be noted that when it is spoken of measuring current I, the obtaining of data representative of current I is considered. However, a measurement of the current is preferred to a measurement of the voltage, which is more difficult to compare.

In a situation where current I is lower than half the no-load current ($I_V/I>2$), the current coupling is greater than optimum coupling $k_{opt}$ (area B, FIG. 6). The optimal coupling then corresponds to a transponder position more remote from the terminal than when it is laid on it. In other words, the optimum coupling may be reached by drawing the transponder away from the terminal, and there exists a distance between the transponder and the terminal for which recovered voltage $V_{C2}$ reaches maximum $V_{C2opt}$. Maximum $V_{C2opt}$ does not correspond to value $V_{C2max}$ and value $V_{C2max}$ is lower than value $V_{C2opt}$.

If current I is greater than $I_V/2$ ($I_V/I<2$), the current coupling is lower than the optimum coupling (area A, FIG. 6). This means that optimum coupling $k_{opt}$ corresponds to a transponder position closer to the terminal. In other words, the optimum coupling may be reached by drawing the transponder closer to the terminal.

In the two above cases, the transponder to be remotely supplied cannot in principle benefit from the possible voltage maximum $V_{C2opt}$ to ensure an optimal communication.

Figure 7:
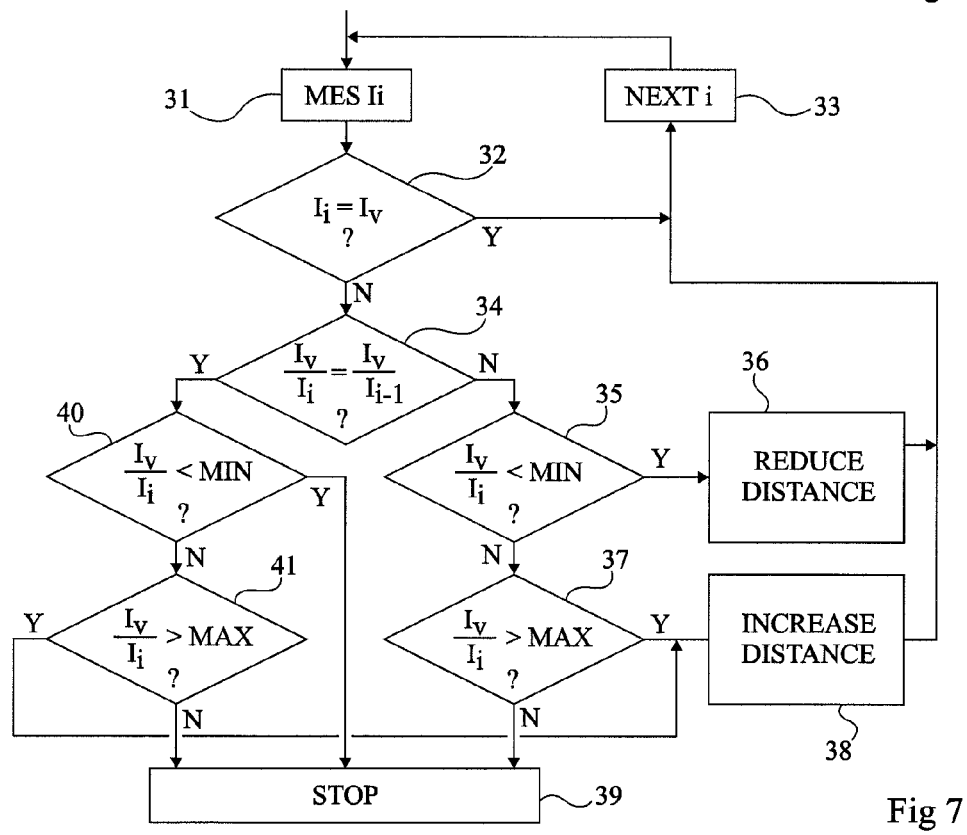
FIG. 7 is a block diagram illustrating an implementation mode of the communication assistance method.

FIG. 7 is a simplified flowchart of an embodiment of the positioning assistance method illustrated in FIGS. 5A to 5C and taking advantage of the curve of FIG. 6.

A periodic measurement (block 31, MES $I_i$) of current value $I_i$ of the current in the terminal is performed. The measurement periodicity is selected to be as short as possible while remaining compatible with the time necessary to exploit the measurements (to execute the method between two measurements). Current value $I_i$ is then compared (block 32, $I_i=I_V$?) with the no-load value. In case they are equal (output Y of block 32), this means that no transponder is present in the terminal field and the method loops back onto a next measurement of the current value of the current (block 33, NEXT$_i$).

When a transponder is in the field of the terminal, the no-load value is no longer equal to the current value (output N of block 32).

The ratio of the no-load current to current value $I_i$ is then calculated and a comparison (block 34, $I_V/I_i=I_V/I_{i-1}$?) of this value with the ratio calculated at the previous iteration (i-1) is performed. This test amounts to determining whether the distance between the transponder and the terminal varies.

If the distance varies (output N of block 34), that is, the user moves one of the two elements with respect to the other, it is determined whether the current ratio is within an acceptable range defined by two thresholds MIN and MAX around the ratio equal to 2, that is, around the optimum coupling with an acceptable tolerance. To achieve this, it is for example started by comparing whether the current is lower than the lower threshold (block 35, $I_V/I_i<$MIN?). If it is (output Y of block 35), this means that the two elements have to be brought closer to each other (block 36, REDUCE DISTANCE). If it is not (output N of block 35), current value $I_V/I_i$ is compared with the maximum threshold (block 37, $I_V/I_i>$MAX?). If maximum threshold MAX is exceeded (output Y of block 37), this means that the transponder should be moved away from the terminal since the optimum coupling point has been passed (block 38, INCREASE DISTANCE). In both cases, a subsequent measurement is performed to verify whether the user has effectively taken the instruction into account (block 33, NEXT$_i$).

If the transponder is within the acceptable distance range (output N of block 37), it is displayed or indicated to the user that this position is correct and the he does not need to move any more (block 39, STOP).

If the transponder no longer moves with respect to the terminal (output Y of block 34), its position with respect to the optimum coupling is examined. For example, it is started by checking whether it is too distant (block 40, $I_V/I_i<$MIN?). If it is (output Y of block 40), this means that, although the transponder has been pressed against the terminal, the optimum coupling position cannot be reached by bringing the transponder closer, generally because of the terminal package. The user is then requested to stop (block 39).

If the motionless position corresponds to a position greater than the minimum, it is checked (block 41, $I_V/I_i>$MAX?) whether ratio $I_V/I_i$ is greater than the maximum value. If it is (output Y of block 41), the user is notified that he should move the transponder away from the terminal (block 38). If it is not, he is told to no longer move since the transponder then is within the acceptable range between thresholds MIN and MAX.

The selection of thresholds MIN and MAX depends on the application and is also performed to provide a hysteresis, which avoids for the notification system to permanently vary. Indeed, it could have been envisaged to directly compare the threshold with value 2. However, this would in practice result, due to the fact that the object is held by a user and is thus sensitive to the displacement of his hand, in an unstable system.

Various embodiments have been described, many variations and modifications will occur to those skilled in the art. In particular, the selection of the thresholds acceptable for the current ratio and the periodicity of the measurements and of the iterations is within the abilities of those skilled in the art according to the application. Further, the inequality relations may correspond to strict or non-strict inequalities. Further, other notification means than sound or visual indicators may be used. For example, a system causing a vibration of the transponder in the case where it is a mobile telecommunication device equipped with an NFC router and stopping the vibration when the reached position is correct or, conversely, causing a vibration thereof once this reached position is correct, may be provided. Further, the practical implementation of embodiments is within the abilities of those skilled in the art based on the functional indications given hereabove and by using hardware and software tools currently present in transponder systems.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method to assist a user to position an electromagnetic transponder with respect to a terminal, comprising:
    storing a no-load value representing a current in an oscillating circuit of the terminal when no transponder is in a field of the terminal;
    periodically determining an immediate load value representing an immediate current in the oscillating circuit of the terminal;
    repeatedly calculating a ratio between the no-load value and the immediate load value;
    determining whether the distance between a transponder and the terminal is too far, too close, or sufficient;
    communicating information to the user based on the act of determining whether the distance between the transponder and the terminal is too far, too close, or sufficient.

2. The method of claim 1, wherein the act of determining includes comparing the ratio to two thresholds surrounding value 2.

3. The method of claim 2, wherein the two thresholds are selected according to operating parameters around an optimum coupling position in which electromagnetic coupling between the transponder and the terminal is considered to be optimal.

4. The method of claim 2, wherein when the ratio is between the two thresholds, the terminal notifies the user to no longer modify the distance between the transponder and the terminal.

5. The method of claim 2, wherein the ratio is successively compared with the two thresholds to define whether the user should increase or decrease the distance between the terminal and the transponder.

6. The method of claim 1, wherein said ratio is compared with a previous value of said ratio calculated in a previous measurement to determine whether the distance between the transponder and the terminal has changed.

7. The method of claim 1, wherein said information indicates to the user whether the distance between the transponder and the terminal should be increased, decreased, or no longer modified.

8. A terminal to read an electromagnetic transponder, comprising:
    an inductive circuit;
    a measurement circuit coupled to the inductive circuit and arranged to measure current flowing in the inductive circuit;
    a storage circuit and
    a control circuit, the control circuit arranged to:
        store a no-load value representing a current in the inductive circuit when no transponder is in an inductive field produced by the inductive circuit;
        repeatedly produce an immediate load value representing an immediate current in the inductive circuit; and
        based on a mathematical combination of the no-load value and the immediate load value, determine whether a distance between a transponder and the terminal is too large, too small, or sufficient; and an output circuit to communicate information to a user representing the determination of whether the distance between the transponder and the terminal is too far, too close, or sufficient.

9. The terminal of claim 8 wherein the terminal is embedded in a mobile telecommunication device.

10. The terminal of claim 8, comprising:
    a comparator circuit coupled to the measurement circuit and the inductive circuit to form a phase regulation loop.

11. The terminal of claim 8, wherein the distance between a transponder and the terminal is too high, too low, or sufficient is based on an optimum coupling coefficient defined as:

$$k_{opt} = k_{immediate} \div (\sqrt{(I_{no\text{-}load} \div I_{immediate}) - 1})$$

wherein:
    $k_{opt}$ is an optimum coupling coefficient;
    $k_{immediate}$ is an immediate coupling coefficient;
    $I_{no\text{-}load}$ is a current flowing in the inductive circuit when no transponder is in the inductive field produced by the inductive circuit; and
    $I_{immediate}$ is an current flowing in the inductive circuit.

12. The terminal of claim 11, wherein the immediate coupling coefficient will approach the optimum coupling coefficient when the distance between the transponder and the terminal becomes smaller, and wherein the immediate coupling coefficient will move away from the optimum coupling coefficient when the distance between the transponder and the terminal becomes too small.

13. The terminal of claim 8, wherein the storage circuit is arranged to store an upper threshold and a lower threshold, and wherein the control circuit is arranged to determine if the immediate load value is between the upper threshold and the lower threshold.

14. The terminal of claim 8, wherein the storage circuit is arranged to store an upper threshold and a lower threshold, and wherein the control circuit is arranged to:
    determine whether the distance between the transponder and the terminal has changed;
    based on a determination that the distance between the transponder and the terminal has changed, determine if the mathematical combination of the no-load value and the immediate load value is below the lower threshold or above the upper threshold; and
    based on a determination that the distance between the transponder and the terminal has not changed, determine if a current relative position of the transponder to the terminal is sufficient.

15. The terminal of claim 8, wherein the control circuit is arranged to:
    output a first indication based on determining the distance between the transponder and the terminal is too large;
    output a second indication based on determining the distance between the transponder and the terminal is too small; and
    output a third indication based on determining the distance between the transponder and the terminal is sufficient.

16. A terminal device, comprising:
    an oscillating means for coupling a terminal to a transponder;
    a memory means for storing a no-load value representative of a current in the oscillating means when no transponder is proximate to the oscillating means;
    a measurement means for repeatedly determining an immediate load value representative of an immediate current in the oscillating circuit;
    a control circuit, the control circuit arranged to:
    calculate, upon each determination of the immediate load value, a ratio between the no-load value and the immediate load value; and
    determine whether the distance between the transponder and the terminal is too far, too close, or sufficient; and
    an output means for communicating information to the user based on determining whether the distance between the transponder and the terminal is too far, too close, or sufficient.

17. The terminal device of claim 16, comprising:
    a comparator circuit coupled to the measurement means and the oscillating means to compare a current ratio between the no-load value and the immediate load value with a previous ratio between the no-load value and the immediate load value.

18. The terminal device of claim 16, wherein the memory means is further for storing an upper threshold and a lower threshold, and wherein the control means is for determining if the immediate load value is between the upper threshold and the lower threshold.

19. The terminal device of claim 18, wherein the upper threshold and the lower threshold are selected according to operating parameters around an optimum coupling coefficient defined as:

$$k_{opt} = k_{immediate} \div (\sqrt{(I_{no\text{-}load} \div I_{immediate}) - 1})$$

wherein:
    $k_{opt}$ is an optimum coupling coefficient;
    $k_{immediate}$ is an immediate coupling coefficient;

$I_{no\text{-}load}$ is a current flowing in the inductive circuit when no transponder is in the inductive field produced by the inductive circuit; and $I_{immediate}$ is a current flowing in the inductive circuit.

* * * * *